Patented June 17, 1947

2,422,247

UNITED STATES PATENT OFFICE 2,422,247

LUBRICANTS, ETC., CONTAINING WAXY HYDROCARBONS AND A KETONE-AROMATIC CONDENSATION PRODUCT AS WAX MODIFIER

Eugene Lieber, Staten Island, N. Y., and Aloysius F. Cashman, Bayonne, N. J., assignors to Standard Oil Development Company, a corporation of Delaware No Drawing. Application December 27, 1940, Serial No. 371,996

6 Claims. (Cl. 252—52)

This invention relates to a novel type of chemical condensation product and to methods of preparing such products and using them for various purposes, more particularly as pour depressors in waxy lubricating oils.

It has been known for some time that substances which reduce the A. S. T. M. pour point of waxy mineral lubricating oils can be made by various chemical condensation reactions involving organic compounds containing long aliphatic hydrocarbon chains, such as by reacting chlorinated paraffin wax with naphthalene. However, a new method has now been discovered for preparing condensation products having pour-depressing properties, by condensing a class of organic compounds containing only short aliphatic hydrocarbon chains with naphthalene or other aromatic compounds.

Broadly, the invention comprises the production of products having wax-modifying properties by chemically condensing a low molecular weight aliphatic ketone having less than 12 carbon atoms with an aromatic compound.

The ketones to be used may be represented by the general formula R—CO—R', where R and R' are aliphatic hydrocarbon groups having a combined total of less than 11 carbon atoms, preferably less than 8 carbon atoms. More broadly the invention comprises the auto-condensation of ketones having the general formula X—R—CO—R'—X', where X and X' may be hydrogen, hydroxyl, or halogen, and X and X' may be the same or different, and where R and R' are aliphatic hydrocarbon groups which may be either saturated or may contain an olefinic linkage and R and R' may be the same or different. Ketones having the formula R—CO—R', where R and R' are alkyl radicals having each less than 6 carbon atoms, are preferred, the invention being considered especially applicable to such ketones having less than a total of 10 carbon atoms. It is particularly preferred to use dialkyl ketones having a total of less than 5 carbon atoms, namely, acetone and methyl ethyl ketone.

Other specific examples of suitable ketones coming within the scope of the invention include diethyl ketone, methyl propyl ketone, dipropyl ketone, methyl butyl ketone, dibutyl ketone, methyl amyl ketone, diamyl ketone, ethyl propyl ketone, ethyl butyl ketone, ethyl amyl ketone, methyl isobutyl ketone, methyl isoamyl ketone, allyl acetone, and others. Mixtures of two or more of these ketones may be used, as well as commercial products consisting essentially of one or more ketones of the class described, together with minor amounts of substances which are either inert or do not interfere with the desired condensation of the ketones with the aromatic compounds in question, which will now be discussed.

The aromatic compounds to be condensed with the ketones should include not only the aromatic compounds but also partially hydrogenated derivatives thereof containing at least one and preferably two or more replaceable hydrogen atoms on the aromatic nucleus. These aromatic compounds may be represented as having the general formula $ArR_n$, where Ar represents an aromatic nucleus and at least one R is a replaceable hydrogen atom, and the other R's are selected from the group consisting of hydrogen, halogen, alkyl, aryl, aralkyl, alkoxy and hydroxy radicals, $n$ representing the total number of R radicals. The aromatic nucleus Ar may be mono- or polynuclear and in the case of polynuclear compounds the nuclei, as in condensed ring compounds, may have several carbon atoms in common, for instance, naphthalene, anthracene, etc., or they may be separate and merely connected with linkages as in the case of diphenyl. One class of aromatic compounds, particularly preferred on account of their availability at relatively low cost, is the class of aromatic hydrocarbons which includes the three compounds mentioned above, and also many others, such as the following: benzene, xylene, phenanthrene, picene, monoamyl benzene, monoamyl naphthalene, methyl naphthalene, etc., as well as partially hydrogenated derivatives thereof, e. g., tetralin (tetrahydronaphthalene), dihydronaphthalene, dihydrobenzene, etc. Also one may use mixtures of various aromatic hydrocarbons, such as those mentioned above, and if desired one may use commercial products consisting essentially of one or more aromatic hydrocarbons, such as the various fractions of coal tar distillates which are rich in aromatic hydrocarbons, and petroleum fractions rich in aromatic hydrocarbons, such as special cuts or fractions obtained from certain aromatic-rich crude petroleums or cracked petroleum fractions by distillation, solvent extraction, etc.

Aroxy compounds are also aromatic compounds which may be used and they include both hydroxy and alkoxy derivatives of aromatic hydrocarbons. Of these the hydroxy derivatives include various phenolic compounds such as phenol itself, the isomeric cresols, alpha- and beta-naphthol, etc., whereas the alkoxy derivatives of aromatic hydrocarbons include benzene, methoxy, naphthalene, etc. Some other examples of oxy aromatic compounds include anisole, para-hydroxy diphenyl, resorcinol, hydroquinone, pyrogallol, chlorphenol, benzyl phenol, beta-naphthyl methyl ether, etc.

Aromatic compounds containing condensed nuclei are especially preferred, examples of such compounds being naphthalene, anthracene, etc., and various derivatives thereof.

The above-described aromatic compounds are all low molecular weight compounds, as distinguished from high molecular weight compounds obtained by Friedel-Crafts condensation of aromatic compounds of that type with chlorinated aliphatic materials such as chlorinated wax.

To effect the condensation, it is preferred to use as catalyst anhydrous aluminum chloride, although other Friedel-Crafts catalysts can be used, such as, boron fluoride, zinc chloride, ferric chloride, titanium tetrachloride, boron trichloride and in some cases even anhydrous hydrogen fluoride.

The proportions in which the reactants should be used are about ½ to 10 mols, preferably about 1 to 5 mols, of ketone to one mol of aromatic compound. The amount of catalyst to be used may vary over a fairly wide range, depending partly upon the nature and amount of the reactants as well as partly on the temperature and time of the reaction, but usually it should be about .05 to 1.0 mol, preferably 0.1 to 0.5 of a mol of aromatic compound.

The condensation is preferably carried out in the presence of an inert solvent, such as a highly refined naphtha or kerosene, tetrachlorethane, carbon disulfide, etc., although in some cases it is not necessary to use a solvent.

In carrying out the invention, the reaction temperature should be maintained between the approximate limits of room temperature and about 300° F. It is preferred to add the catalyst to the reactants gradually at room temperature and then to heat the reaction mass to a temperature of between about 150° to 200° F. to maintain it there for a sufficient length of time such as ½ to 10 hours, preferably 1 to 5 hours, to produce the desired product. At the lower temperatures, a longer time is required, and vice versa. The temperature and time should be adjusted for the desired combination of yield and potency of pour depressor.

As to the order of mixing the materials, it is preferred to add the catalyst to the aromatic compound with stirring, and then to add the aliphatic ketone to the mixture; but also other methods can be used, for instance, one can mix the aliphatic ketone and the aromatic compound first, and then add the catalyst gradually to that mixture.

After the reaction has been completed, which may be judged by testing small samples of the product, the condensing agent is separated from the reaction mass according to known methods as, for example, by cooling and diluting with an inert diluent such as a refined kerosene and then hydrolyzing or neutralizing the Friedel-Crafts catalyst by adding to, or pouring it into, water, an aqueous solution of caustic soda, an alcohol, or a mixture thereof, such as a mixture of water and alcohol. The kerosene extract is then allowed to settle and the catalyst-sludge layer is drawn off. The kerosene extract is then filtered, if necessary, to remove any insoluble material and then distilled to remove the solvent and low boiling products, this distillation being preferably carried out under vacuum or with fire and steam, in the latter case carrying the temperature up to about 600° F.

The condensation product of this invention generally has a color and texture ranging from a green viscous oil to a brown resin. It is soluble in hydrocarbon oils, has a high molecular weight and is substantially non-volatile at temperatures below about 600° F. The chemical structure of these condensation products is very complicated and is not known with certainty; however, it is believed that these products are essentially high molecular weight, linear type compounds built up of more or less regularly alternated aromatic and aliphatic groups, the aliphatic portions of which are at least partly highly branched. These condensation products are probably essentially hydrocarbon in nature as it is believed that most of the oxygen content of the raw materials, i. e., the low molecular weight aliphatic ketones and any oxygen which may have been present in the aromatic compounds as in the case of phenol, etc., probably was combined with some hydrogen atoms from adjacent molecules of reactants and split off in the form of water.

The product of this invention has the property of modifying the crystal structure of waxes such as paraffin wax present when added to compositions containing the same. For instance, when about .05–10.0%, preferably .2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc. or for making various molded products.

For the sake of illustration but without intending to limit the invention to the particular materials or reaction conditions used, the following experimental data are given:

Into a 3-liter-4-neck round bottom flask equipped with a mechanical stirrer, thermometer, reflux condenser and dropping funnel were placed 128 grams of naphthalene, 150 grams of anhydrous aluminum chloride and 300 cc. of kerosene (rendered inert by vigorous treatment with sulfuric acid) as solvent. The reaction flask is immersed in a bath of running tap water for cooling. The stirrer is started and 128 grams of methyl-ethyl-ketone were slowly added to the reaction mixture over a period of ten minutes. During the addition of the ketone the reaction temperature was maintained between 70° and 80° F. After the addition of the ketone the reaction temperature was increased to 160°–170° F. and maintained thereat for 4 hours. After cooling, the reacting mixture was diluted with kerosene and neutralized with an alcohol-water mixture. After settling, the kerosene extract was distilled with fire and steam to 600° F. in order to remove solvent and low-boiling products. A bottoms residue comprising 49 grams of a brown-resinous solid was obtained as product. The pour-depressing potency of this condensation product was determined by dissolving 2% of it in a waxy mineral lubricating oil base stock having a pour point of +30° F. and then testing the resultant blend for pour point according to the standard A. S. T. M. method.

A number of other tests were made using more or less the same general procedure as that described above, except that different reactants were used, in some cases different amounts of reactions or catalyst, and so forth. The results of these examples, together with those set forth above, are summarized in the following table. The products indicated in the last column as being resins were all brown colored resins and those indicated as oils were all green viscous oils. In all eight tests the reaction temperature was maintained at about 160°–170° F. for about 4 hours.

Table

| Test No. | Ketone | | Aromatic | | Solvent | | AlCl₃ Gm. | Product | | |
|---|---|---|---|---|---|---|---|---|---|---|
| | Name | Amt. | Name | Amt. | Name | cc. | | Yield, Gm. | Pour Point, °F. 2% Blend | |
| 1 | Meth. Eth. Ketone | 128 g | Naphthalene | 128 g | Kerosene | 300 | 150 | 49 | −15 | Resin. |
| 2 | do | 128 g | do | 128 g | Tetrachlorethane | 300 | 150 | 51 | −30 | Do. |
| 3 | Acetone | 58 g | Tetralin | 132 g | do | 300 | 150 | 76 | −10 | Oil. |
| 4 | do | 58 g | Naphthalene | 128 g | do | 300 | 150 | 84 | 0 | Resin. |
| 5 | do | 1000 cc | Benzene | 100 cc | do | 300 | 200 | 28 | −10 | Oil. |
| 6 | do | 58 g | Phenol | 94 g | do | 300 | 150 | 40 | 0 | Do. |
| 7 | do | 58 g | O-m-cresol mixt | 109 g | do | 300 | 150 | 49 | −5 | Do. |
| 8 | Meth. Eth. Ketone | 72 g | Phenol | 94 g | Kerosene | 300 | 150 | 57 | −10 | Do. |

As shown in the above table, an addition of 2% of the condensation product of a low molecular weight aliphatic ketone with various aromatic compounds, such as naphthalene, phenol, cresol, etc., reduced the pour point of a waxy mineral lubricating oil having the original pour point of +30° F. down to various temperatures ranging from 0 to as low as −30° F., thus indicating that these condensation products are very potent pour depressors. This is quite unexpected because no long chained aliphatic compounds or radicals (such as have been heretofore thought necessary) were used in the preparation of the present compounds.

It is not intended that this invention be limited to any of the specific examples which were given merely for the sake of illustration nor to any theory as to the mechanism of the operation of the invention but only by the appended claims in which it is intended to claim all novelty inherent in the invention as broadly as the prior art permits.

We claim:

1. A wax composition comprising a wax and a wax modifier, the latter consisting essentially of a Friedel-Crafts condensation product of an aliphatic ketone having less than 12 carbon atoms with a low molecular weight aromatic compound containing at least one replaceable hydrogen atom on the aromatic nucleus, said condensation product being substantially non-volatile under fire and steam distillation conditions at temperatures up to 600° F.

2. An oil composition comprising a hydrocarbon oil base and a small proportion of a wax modifier consisting essentially of a Friedel-Crafts condensation product of an aliphatic ketone having less than 10 carbon atoms with a low molecular weight aromatic compound having the general formula $ArR_n$, where Ar represents an aromatic nucleus, at least one R is replaceable hydrogen and the other R's are selected from the group consisting of hydrogen, halogen, alkyl, aryl, aralkyl, alkoxy and hydroxy radicals, $n$ representing the number of R radicals, said condensation product being substantially non-volatile under fire and steam distillation conditions at temperatures up to 600° F.

3. An oil composition comprising a waxy mineral lubricating oil base and a small amount of a pour depressor consisting essentially of a Friedel-Crafts condensation product of a dialkyl ketone having a total of less than 10 carbon atoms with a low molecular weight aromatic hydrocarbon, said condensation product being substantially non-volatile under fire and steam distillation conditions at temperatures up to 600° F.

4. An oil composition comprising a waxy mineral lubricating oil base and a small amount of a pour depressor consisting essentially of a Friedel-Crafts condensation product of a dialkyl ketone having a total of less than 10 carbon atoms with a low molecular weight oxy-aromatic compound containing at least one replaceable hydrogen atom on the aromatic nucleus, said condensation product being substantially non-volatile under fire and steam distillation conditions at temperatures up to 600° F.

5. An oil composition comprising a waxy mineral lubricating oil base and a pour depressing amount of a Friedel-Crafts condensation product of a dialkyl ketone having less than a total of 5 carbon atoms with naphthalene, said condensation product being substantially non-volatile under fire and steam distillation conditions at temperatures up to 600° F.

6. An oil composition comprising a waxy mineral lubricating oil base and a pour depressing amount of a Friedel-Crafts condensation product of acetone and naphthalene, such condensation product being substantially non-volatile under fire and steam distillation conditions at temperatures up to 600° F.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| 2,033,546 | Ralston | Mar. 10, 1936 |
| 2,225,671 | Van Zoeren | Dec. 24, 1940 |
| 2,174,246 | Lieber | Sept. 26, 1939 |
| 2,147,547 | Reiff | Feb. 14, 1939 |
| 1,714,378 | Knorr | May 21, 1929 |
| 2,238,638 | Gleason | Apr. 15, 1941 |

OTHER REFERENCES

Page 491 of Ipatieff's book entitled "Catalytic Reactions at High Pressures and Temperatures," (1939). (Copy in Division 64.)